United States Patent
Diamond et al.

(10) Patent No.: US 11,803,377 B2
(45) Date of Patent: Oct. 31, 2023

(54) EFFICIENT DIRECT CONVOLUTION USING SIMD INSTRUCTIONS

(71) Applicant: Oracle International Corporation, Redwood City, CA (US)

(72) Inventors: Jeffrey R. Diamond, Austin, TX (US); Avadh P. Patel, Cedar Park, TX (US)

(73) Assignee: Oracle International Corporation, Redwood City, CA (US)

( * ) Notice: Subject to any disclaimer, the term of this patent is extended or adjusted under 35 U.S.C. 154(b) by 122 days.

(21) Appl. No.: 15/941,975

(22) Filed: Mar. 30, 2018

(65) Prior Publication Data

US 2019/0079764 A1  Mar. 14, 2019

Related U.S. Application Data

(60) Provisional application No. 62/556,274, filed on Sep. 8, 2017.

(51) Int. Cl.
*G06F 9/30* (2018.01)
*G06F 9/38* (2018.01)
(Continued)

(52) U.S. Cl.
CPC ........ *G06F 9/30036* (2013.01); *G06F 9/3001* (2013.01); *G06F 9/30032* (2013.01);
(Continued)

(58) Field of Classification Search
CPC .. G06F 9/30036; G06F 9/30032; G06F 17/15; G06F 9/3887; G06F 9/3001;
(Continued)

(56) References Cited

U.S. PATENT DOCUMENTS 5,734,874 A * 3/1998 Van Hook ............. G06T 1/20
345/559
6,115,812 A * 9/2000 Abdallah ........... G06F 9/30014
708/520

(Continued)

FOREIGN PATENT DOCUMENTS

CN 1522401 A 8/2004
CN 1577257 A 2/2005
(Continued)

OTHER PUBLICATIONS

International Search Report and Written Opinion dated Dec. 17, 2018 in PCT/US2018/049666, Oracle International Corporation.
(Continued)

*Primary Examiner* — Shawn Doman
(74) *Attorney, Agent, or Firm* — Robert C. Kowert; Kowert, Hood, Munyon, Rankin & Goetzel, P.C.

(57) ABSTRACT

A computer comprising one or more processors offering vector instructions may implement a direct convolution on a source data set. The source data set may be one-dimensional or multi-dimensional. For a given vector width, w, of the vector instructions, w consecutive data elements of the output data set are computed in parallel using vector instructions. For multi-dimensional data sets, multiple vectors of the output data set are computed for a single load of a set of vectors from the source data set. New vector instructions are disclosed to improve the performance of the convolution and to enable full utilization of the arithmetic logic units within the one or more processors.

20 Claims, 13 Drawing Sheets

(51) Int. Cl.
*G06F 17/15* (2006.01)
*G06N 3/063* (2023.01)
*G06N 3/045* (2023.01)
*G06N 3/08* (2023.01)

(52) U.S. Cl.
CPC ............ *G06F 9/3887* (2013.01); *G06F 17/15* (2013.01); *G06N 3/045* (2023.01); *G06N 3/063* (2013.01); *G06N 3/08* (2013.01)

(58) Field of Classification Search
CPC ...... G06F 15/80; G06N 3/063; G06N 3/0454; G06N 3/08
USPC .................................................. 712/22, 222
See application file for complete search history.

(56) References Cited

U.S. PATENT DOCUMENTS

| | | |
|---|---|---|
| 7,623,732 B1 | 11/2009 | Thieret et al. |
| 8,572,586 B2 | 10/2013 | Eichenberger et al. |
| 9,363,068 B2 | 6/2016 | Azadet |
| 9,529,591 B2 | 12/2016 | Rubinstein et al. |
| 2003/0084082 A1 | 5/2003 | Debes |
| 2004/0133617 A1* | 7/2004 | Chen ................... G06F 9/30014 708/523 |
| 2004/0267857 A1 | 12/2004 | Abel |
| 2005/0125636 A1 | 6/2005 | Ford |
| 2005/0198473 A1* | 9/2005 | Ford ................... G06F 9/30036 712/221 |
| 2005/0216545 A1* | 9/2005 | Aldrich ............... G06F 9/30014 708/670 |
| 2008/0071851 A1* | 3/2008 | Zohar ................... G06F 7/5443 708/626 |
| 2009/0089540 A1* | 4/2009 | Hansen ............... G06F 9/30014 712/29 |
| 2010/0180100 A1 | 7/2010 | Lu |
| 2014/0108477 A1 | 4/2014 | Azadet et al. |
| 2015/0086134 A1* | 3/2015 | Hameed ..................... G06T 1/20 382/279 |
| 2015/0261534 A1* | 9/2015 | Uliel ................... G06F 9/30145 712/208 |
| 2017/0024218 A1* | 1/2017 | Mahurin ............... G06F 9/3887 |
| 2017/0357894 A1* | 12/2017 | Bainville ............. G06N 3/0454 |
| 2018/0004518 A1* | 1/2018 | Plotnikov ........... G06F 9/30036 |
| 2018/0307980 A1* | 10/2018 | Barik ................... G06N 3/0445 |
| 2019/0004795 A1* | 1/2019 | Kuramoto ............. G06F 7/5443 |

FOREIGN PATENT DOCUMENTS

| | | |
|---|---|---|
| CN | 101923534 B | 2/2012 |
| EP | 3093757 A2 | 11/2016 |
| JP | 189868 A | 8/1991 |
| WO | 2003038601 A1 | 5/2003 |
| WO | 2013063440 A1 | 5/2013 |

OTHER PUBLICATIONS

Office Action dated Jul. 2, 2021 in European Patent Application No. 18779130.6, Oracle International Corporation.
Office Action dated Oct. 25, 2022 in Japanese Patent Application No. 2020-513910, Oracle International Corporation.
Office Action dated Feb. 6, 2023 in Chinese Patent Application No. 201880066852.7, Oracle International Corporation, pp. 1-25 (including translation).

* cited by examiner

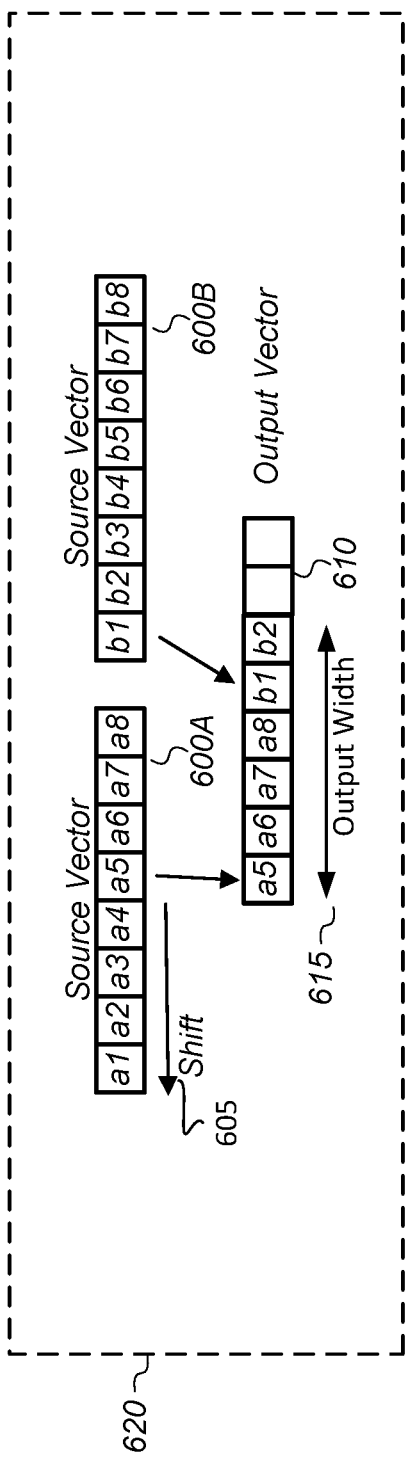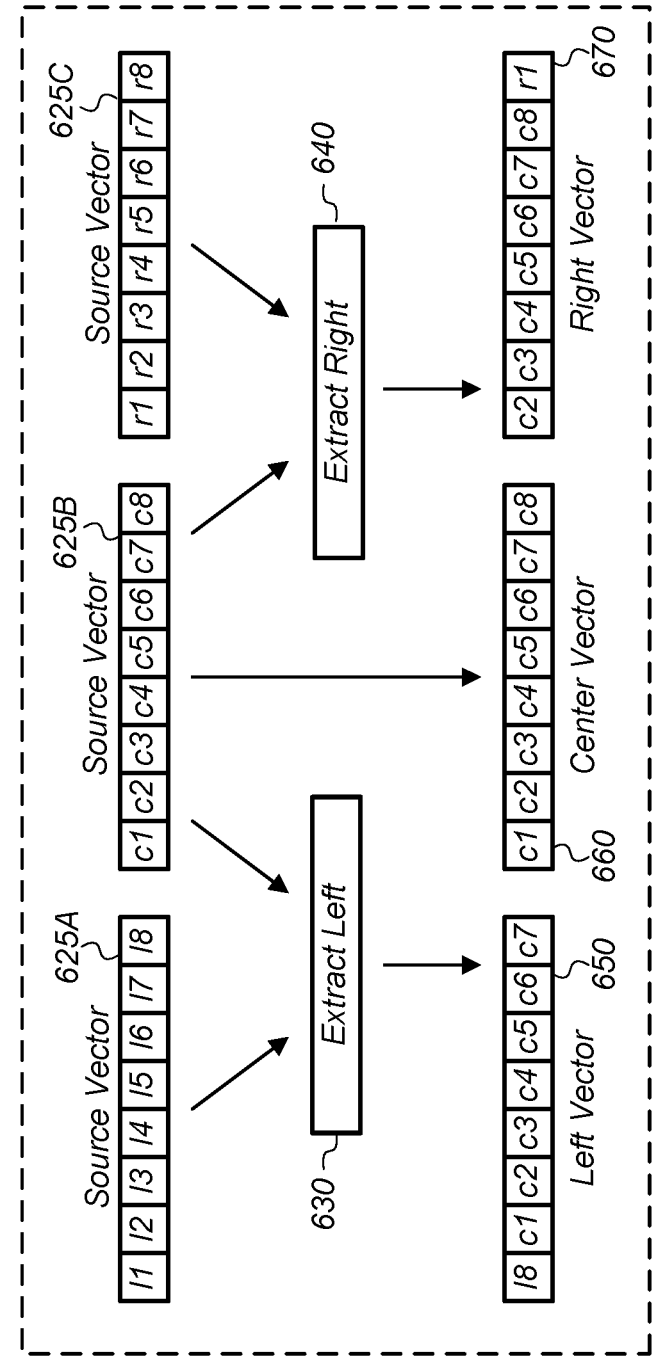

EFFICIENT DIRECT CONVOLUTION USING SIMD INSTRUCTIONS

PRIORITY CLAIM

The present application claims benefit of priority to provisional application No. 62/556,274 titled "Efficient Direct Convolution Using SIMD Instructions" and filed on Sep. 8, 2017 which is incorporated by reference in its entirety as though fully and completely set forth herein.

BACKGROUND

Field of the Disclosure

This disclosure relates generally to digital signal processing, machine learning and neural networks, and more particularly to systems and methods for filtering of signals using convolution operations.

Description of the Related Art

In digital signal processing, a convolution is a weighted sum of an input value and its immediate neighboring values in a data set producing an output value of an output data set. These data sets may be single dimensional or multi-dimensional with corresponding data organization determining the values which are immediate neighbors of the input value. The weighting values of the convolution are specified in a convolution kernel where the kernel possesses the same number of dimensions as the input and output data sets. Convolution operations are useful in great variety of signal processing applications and are integral to the operation of many aspects of deep neural networks.

Convolutions may be used pervasively in machine learning applications. In this context it is common to apply convolutions on a single data set using many, small convolution kernels. As a result, convolutions are often a computationally intensive portion of machine learning applications so an efficient means of performing convolution operations is of increasingly great value.

One popular approach to improving convolution efficiency, convolution lowering, involves converting the convolution operation into an equivalent computational process that can be solved by optimized dense linear algebra. This allows the use of optimized General Matrix Multiply (GEMM) routines which are adept at leveraging inherent reuse of data, minimizing off-chip bandwidth needs, and subdividing computation that can be spread across many cores. There are also significant disadvantages to this approach, convolution lowering adds additional processor overhead and increases data size significantly. Increased data size makes caching difficult and increases off-chip bandwidth usage, leading to solutions that prefer expensive, high performance memory in lieu of caching and conventional memory technologies.

A second approach is to perform the convolution in frequency domain. This requires the input data set and the convolution kernel to each be converted into frequency domain, the two converted data sets multiplied together, and an inverse frequency transform applied to the product. This approach offers similar advantages and disadvantages to convolution lowering, the multiplication operation may again be implemented by GEMM routines but additional computational overhead is added and memory footprint may increase dramatically for small kernel sizes. In machine learning applications where many, small kernels are used, convolution in frequency domain is unappealing due to the requirement to convert the many, small kernels to frequency domain.

A third approach, commonly referred to as "direct convolution", applies convolution filters directly to data in time or spatial domain. This approach avoids the additional computational overhead and memory growth of the previous approaches but suffers from much lower processor utilization, less parallelism and exploitation of reuse, or hardware that is dedicated only to solving convolutions. Typically, such hardware does not leverage existing resources of conventional hardware and is nontrivial to program and optimize for a given deep neural network.

SUMMARY

Methods and systems for providing efficient direct convolution operations using a central processing unit (CPU) providing vector instructions are described. Efficient direct convolution operations are useful in machine learning and deep neural network applications where convolution operations may demand significant memory bandwidth and computational resources. These convolution applications are commonly characterized by the use of smaller convolution kernel sizes where direct convolution approaches would otherwise be memory bandwidth constrained. By implementing direct convolutions on the main CPU using the approaches disclosed herein, a system may avoid the need for dedicated hardware accelerators or general purpose GPU (GPGPU) solutions, thus allowing better performance scaling in these applications, while fully utilizing computational resources as well as cache and memory bandwidth in the smaller kernel sizes typically used in machine learning applications.

To increase data-level parallelism in hardware, a processor may include vector instructions providing parallel execution lanes for each instruction executed, such as in a Single Instruction Multiple Data (SIMD) micro-architecture. This type of micro-architecture may provide higher throughput for certain applications than single-lane or general-purpose micro-architectures. While general-purpose micro-architectures operate on a single lane of data contained in registers, SIMD micro-architectures operate on data contained in vectors composed of multiple lanes of independent data.

In some embodiments, multiple SIMD source vectors are loaded, one source vector aligned with the destination vector to be computed, one or more source vectors including left-partial data with respect to the destination vector, and one or more source vectors including right-partial data with respect to the destination vector. Each of these source vectors is multiplied with respective convolution coefficient vectors and added to accumulator vector. Once all source vectors have been processed, the accumulator vector is written to the destination vector.

In some embodiments, the convolution to be performed may be a multi-dimensional convolution. In these embodiments multiple accumulator vectors may be computed simultaneously using the same loaded source vectors. The various source vectors may be multiplied with other convolution coefficient vectors corresponding to other dimensions of the convolution kernel and the multiple accumulator vectors may not be written until all source vectors for a given destination vector have been processed.

In some embodiments, a SIMD instruction may be provided to extract unaligned SIMD vectors from pairs of aligned SIMD vectors. In these embodiments, the aligned source vector as well as the plurality of shifted source vectors may be loaded from a common data source.

In some embodiments, a SIMD instruction may be provided to perform a SIMD Scalar Multiply-and-Add operation where each lane of a data vector is multiplied by a scalar quantity and added to a respective lane of a base vector.

In some embodiments, convolution operations may be performed on multiple input data sets simultaneously by computing partial-resolution output data sets using pre-interleaved source data. In these embodiments, a SIMD instruction may be provided to perform a de-interlacing operation on computed data vectors to extract partial-resolution output data vectors.

The various embodiments disclosed transform the computation of direct convolutions from operations traditionally limited by memory bandwidth to ones that fully exploit the computational resources and bandwidth of cache and memory subsystems while requiring only the main CPU, and while these embodiments are especially suited to direct convolution computations, it should be noted that they may apply more generally to a variety of computational tasks, for example to general parallel traversal techniques.

BRIEF DESCRIPTION OF THE DRAWINGS

FIG. 6A illustrates an Extract vector instruction that generates a data vector comprising a subset of the concatenation of two source vectors, according to at least some embodiments.

FIG. 6B illustrates the use of the Extract vector instruction of FIG. 6A to load a set of source vectors for a convolution operation using a set of aligned, sequential source input vectors, according to at least some embodiments.

Figure 1:
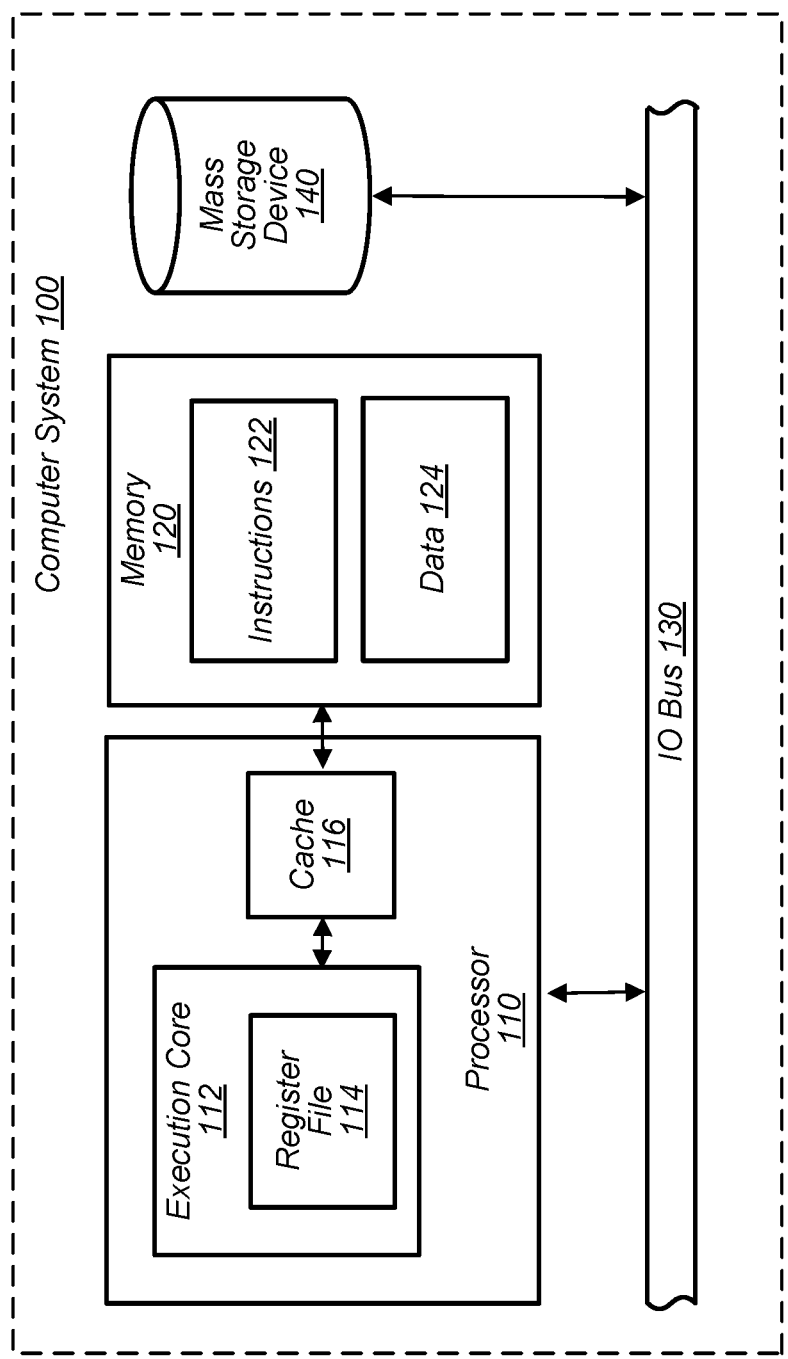
FIG. 1 is a block diagram of one embodiment of a computer system.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Deep neural networks have become increasingly important in solving a wide range of generic problems in conjunction with large data sets. These networks, however, spend a significant amount of processing time in convolutions and matrix multiplications, with processing time more than doubled per pass during the training phase in order to update neuron weights. A large number of passes may further be needed for slowly converging networks. As a result, efficient convolution computations are increasingly important.

Methods and systems for providing efficient direct convolution operations using a central processing unit (CPU) providing vector instructions are described. Efficient direct convolution operations are useful in deep neural network applications and other applications where convolution operations may demand significant computational resources. By implementing convolutions on the main CPU, a system may avoid the need for dedicated hardware accelerators or general purpose GPU (GPGPU) solutions, thus allowing better performance scaling in convolutional neural network applications.

FIG. 1 provides a block diagram of one embodiment of a computer system. Computer System 100 includes a Processor 110, a Memory 120, and a Mass Storage Device 140 attached to an 10 Bus 130. The Processor 110 includes an Execution Core 112, including a Register File 114, coupled to a Cache 116. It is noted that, although specific components are shown and described in Computer System 100, in alternative embodiments, different components and numbers of components may be present. For example, Computer System 100 may not include the Mass Storage Device 140 while multiple processors similar to the Processor 110 may be included. Additionally, while a single Cache 116 is shown internal to the Processor 110, a hierarchical cache including multiple levels both internal and external to the Processor 110 may be present. Computer System 100 may also include graphics processors, user-interface devices, network cards, and/or other peripheral devices that are coupled to Processor 110 using the 10 Bus 130, a network, or other communication channel.

In various embodiments, the Processor 110 may be representative of a general-purpose processor that performs computational operations. For example, the Processor 110 may be a central processing unit (CPU) such as a microprocessor, microcontroller, application-specific integrated circuit (ASIC), or field-programmable gate array (FPGA). The Processor 110 may be a standalone component or may be integrated with other components (e.g. other processors, or other components in a system on a chip (SOC) or FPGA) or may be a component in a multichip module (MCM) with other components. The Processor 110 may include one or more mechanisms for vector processing (e.g., vector execution units).

As illustrated in FIG. 1, the Processor 110 may include an Execution Core 112. The Execution Core 112 may be configured to execute instructions defined in an instruction set architecture implemented by the Processor 110. The Execution Core 112 may have various micro-architectural features and implementation features, as desired. For example, the Execution Core 112 may include superscalar or scalar implementations. The Execution Core 112 may include in-order or out-of-order implementations, and speculative or non-speculative implementations. The Execution Core 112 may include any combination of the above features. The implementations may include microcode in some embodiments. The Execution Core 112 may also include a variety of execution units, each execution unit configured to execute operations of various types (e.g. integer, floating point, vector, multimedia, load/store, etc.). The Execution Core 112 may include different numbers pipeline stages and various other performance-enhancing features such as branch prediction. The Execution Core 112 may include one or more of instruction decode units, schedulers or reservations stations, reorder buffers, memory management units, I/O interfaces, etc.

he Register File 114 may include a set of registers that may be used to store operands for various instructions. The Register File 114 may include registers of various data types, based on the type of operand the Execution Core 112 is configured to store in the registers (e.g. integer, floating point, multimedia, vector, etc.). The Register File 114 may include architected registers (i.e. those registers that are specified in the instruction set architecture implemented by the Processor 110). Alternatively or in addition, the Register File 114 may include physical registers (e.g. if register renaming is implemented in the Execution Core 112).

The Cache 116 may be illustrative of any caching structure. For example, the Cache 116 may be implemented as a Harvard architecture (separate instruction cache for instruction fetching and data cache for data read/write by execution units for memory-referencing operations), as a shared instruction and data cache, etc. In some embodiments, load/store execution units may be provided to execute the memory-referencing operations.

An instruction may be an executable entity defined in an instruction set architecture implemented by the Processor 110. There are a variety of instruction set architectures (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the Processor 110. Some instructions may be microcoded in some embodiments.

The mass-storage device 110, Memory 120 and Cache 116 are storage devices that collectively form a memory hierarchy that stores data 124 and instructions 122 for Processor 110. More particularly, the mass-storage device 110 may be a high-capacity, non-volatile memory, such as a disk drive or a large flash memory unit with a long access time, while Cache 116 and Memory 120 may be smaller but with shorter access times. These faster semiconductor memories store copies of frequently used data. Memory 120 may be representative of a memory device in the dynamic random access memory (DRAM) family of memory devices. The size of Memory 120 is typically larger than Cache 116 whereas Cache 116 is typically implemented using smaller devices in the static random access memories (SRAM) family of devices. In some embodiments, cache 116, Memory 120 and mass-storage device 110 are shared between one or more processors in Computer System 100.

It is noted the data and instructions may be stored on a non-transitory computer-readable storage device, which may be any device or storage medium that can store code and/or data for use by a computer system (e.g., Computer System 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, Memory 120 and Cache 116 are all examples of non-transitory computer readable storage media.

As mentioned above, the Execution Core 112 may be configured to execute vector instructions. The vector instructions may be defined as single instruction-multiple-data (SIMD) instructions in the classical sense, in that they may define the same operation to be performed on multiple data elements in parallel. The data elements operated upon by an instance of an instruction may be referred to as a vector and are organized in data lanes. These data elements may contain data of various, multi-bit data types based on the type of operand the Execution Core 112 is configured to store in the registers (e.g. integer, floating point, multimedia, vector, etc.). For simplicity, vectors in the disclosure are represented as including eight data lanes, although it should be understood that this is not intended to limit the disclosure to this particular vector organization. On the contrary, those skilled in the art will recognize that vectors may be configured provide any number of data lanes. In some embodiments, there may be 32 vector registers in the vector register file, and each vector register may include 128 bits. However, in alternative embodiments, there may be different numbers of vector registers and/or different numbers of bits per register. Generally, vector lengths may be implemented as powers of two (e.g., two, four, eight, etc.). However, in some embodiments, vector lengths need not be powers of two. Furthermore, embodiments which implement register renaming may include any number of physical registers that may be allocated to architected vector registers. Architected registers may be registers that are specifiable as operands in vector instructions.

In digital signal processing, a convolution is a weighted sum of an input value and its immediate neighboring values in a data set producing an output value of an output data set. These data sets may be one-dimensional or multi-dimensional with corresponding data organization determining the values which are immediate neighbors of the input value. The weighting values of the convolution are specified in a convolution kernel where the kernel possesses the same number of dimensions as the input and output data sets.

Figure 2A:
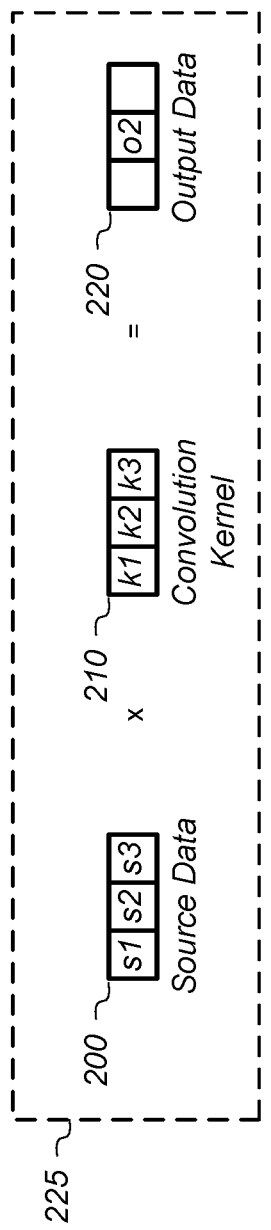
FIG. 2A is a block diagram illustrating a one-dimensional convolution of a data element with a three element convolution kernel.

FIG. 2A depicts a one-dimensional convolution operation 225. In FIG. 2A, the data element s2 of Source Data 200 is to be convolved with a three-element Convolution Kernel 210 to produce data element o2 in the Output Data 220. In addition, data elements s1 and s3 of Source Data 200 are required for the convolution as immediate left and right neighbors of the data element s2. The output data is the weighted sum of the Source Data elements with respective weighting factors k1-k3 of the Convolution Kernel 210, in other words o2=k1*s1+k2*s2+k3*s3.

Figure 2B:
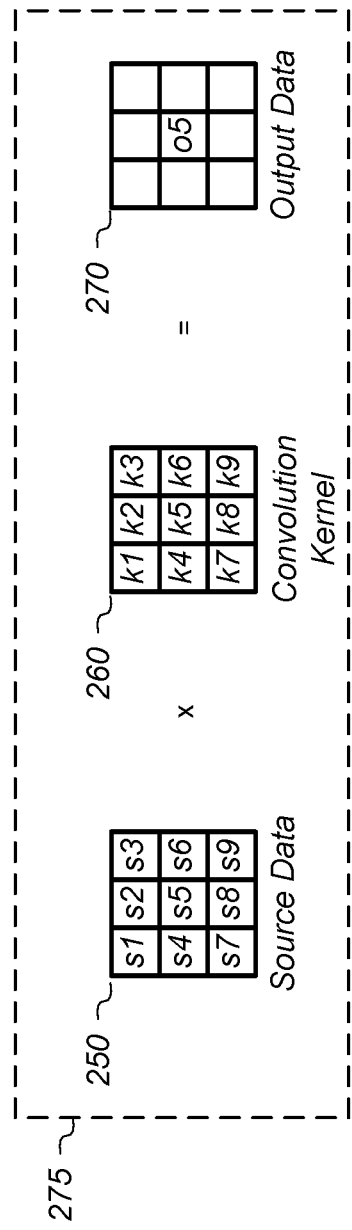
FIG. 2B is a block diagram illustrating a two-dimensional convolution of a data element with a 3×3 element convolution kernel.

FIG. 2B depicts a two dimensional convolution operation 275. In FIG. 2B, the data element s5 of Source Data 250 is to be convolved with a 3×3-element Convolution Kernel 260 to produce data element o5 in the Output Data 270. In addition, data elements s1-s4 and s6-s9 of Source Data 250 are required for the convolution as immediate neighbors, left, right, above and below, of the data element s2. The output data is the weighted sum of the Source Data elements with respective weighting factors k1-k9 of the Convolution Kernel 260, in other words o5=k1*s1'k2*s2+k3*s3+k4*s4+k5*s5+k6*s6+k7*s7+k8*s8+k9*s9.

It should be understood that the examples of one and two dimensional convolutions are not intended to limit the disclosure to these particular convolution organizations. On the contrary, those skilled in the art will recognize that convolutions may be performed with any number of dimensions. Furthermore, the examples are not intended to limit convolutions to three elements per dimension and those skilled in the art will recognize that convolutions may be performed with other numbers of elements per dimension.

Figure 3:
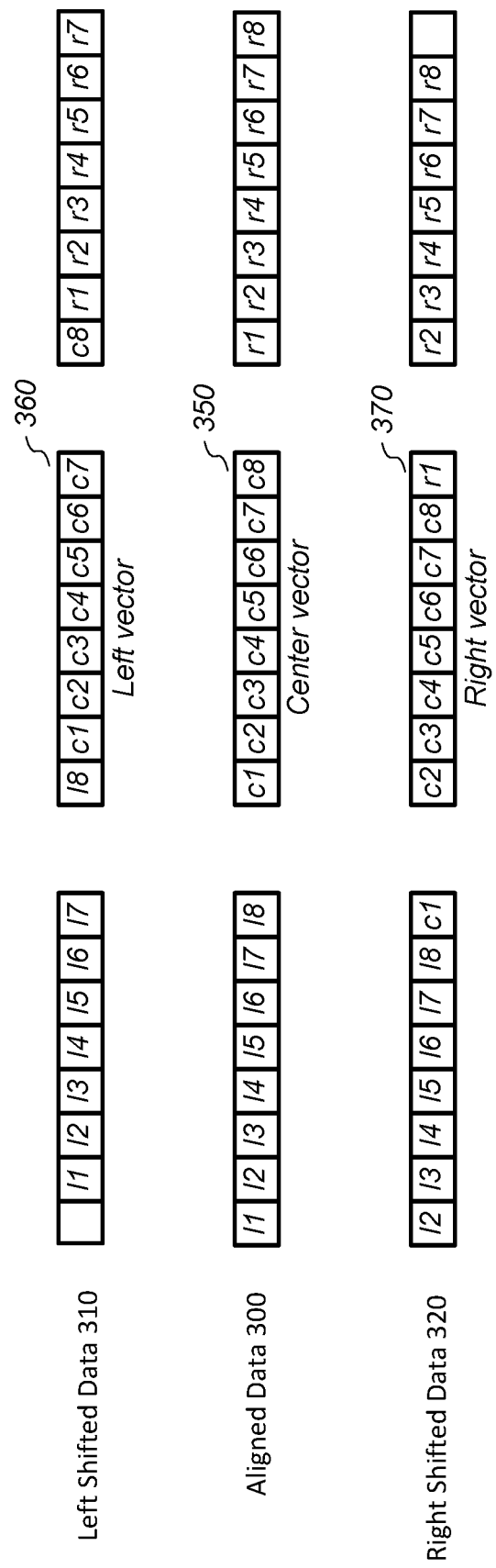
FIG. 3 is a block diagram illustrating left- and right-shifted data streams supporting aligned loading of source vectors for use with a three element convolution kernel, according to at least some embodiments.

FIG. 3 illustrates a method of pre-shifting of source data sets according to some embodiments. In addition to an Aligned Data 300, FIG. 3 shows Left Shifted Data 310 corresponding to a data set 350 where vector alignment has been shifted left one data lane 360 and Right Shifted Data 320 corresponding to a data set 350 where vector alignment has been shifted right one data lane 370. The three data sets, 300, 310 and 320, correspond to a convolution operation using a convolution kernel consisting of three columns. Such convolutions may be one-dimensional convolutions or multi-dimensional convolutions. Furthermore, it should be understood that the pre-shifting of data sets is not limited to convolutions of three columns. Those skilled in the art will recognize that any number of columns may be supported, for example a five column convolution may have a total of five source data sets, the three shown in FIG.3, 300, 310 and 320, as well as a double left-shifted data set and a double right-shifted data set.

Figure 4:
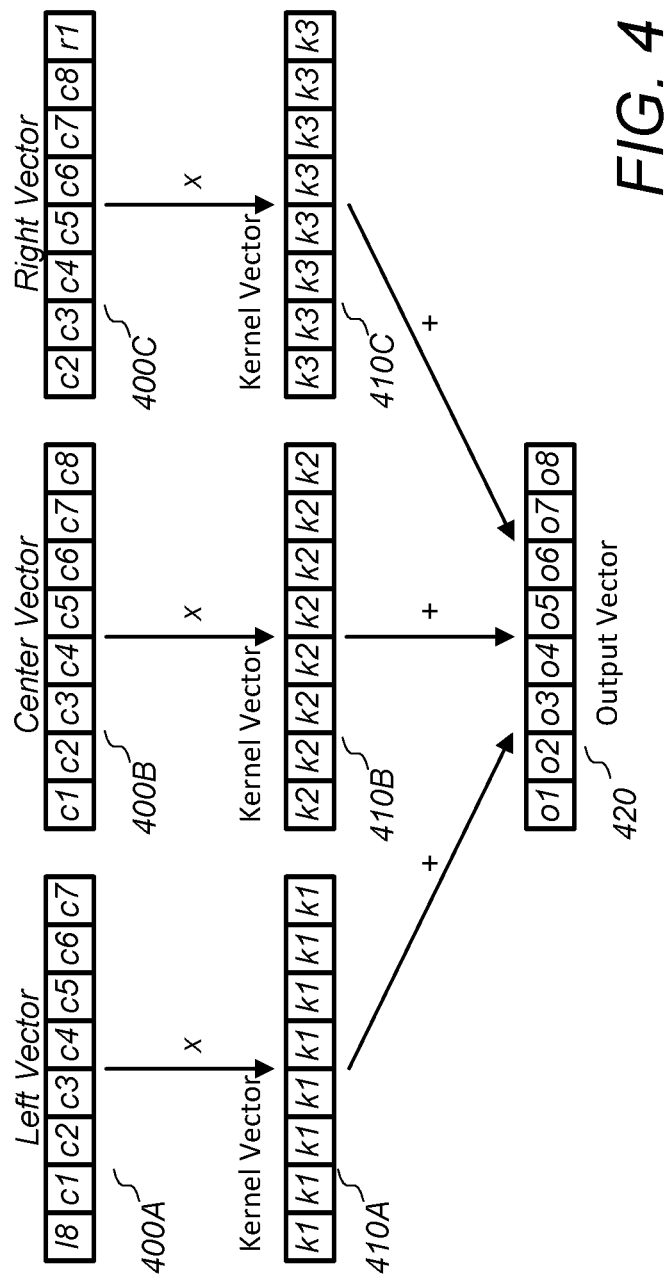
FIG. 4 illustrates the computing of an output vector for a three element, one-dimensional convolution using aligned, left-shifted and right-shifted source vectors with respective kernel vectors, according to at least some embodiments.

FIG. 4 illustrates the computation of a convolution output vector using a one-dimensional three element convolution kernel given pre-shifted source vectors. The pre-shifted source vectors 400A, 400B, and 400C may be loaded from pre-shifted data sets such as illustrated in FIG. 3 in some embodiments but may also be loaded using a variety of other methods in other embodiments. The Kernel Vectors 410A, 410B and 410C are vector representations of the Convolution Kernel 210 of FIG. 2A. Each Kernel Vector is comprised of a respective Convolution Kernel weighting value replicated into all data lanes of the Kernel Vector. For example, the Kernel Vector 410B corresponds to the middle weighting value of the Convolution Kernel 210 and thus has the weighting value k2 replicated into all its data lanes. The Output Vector 420 is thus the sum of the source vectors 400 multiplied by their respective kernel vectors 410. The convolution computation illustrated in FIG. 4 is not limited performing convolutions involving only three kernel columns but may be expanded to implement any number of kernel columns.

Figure 5:
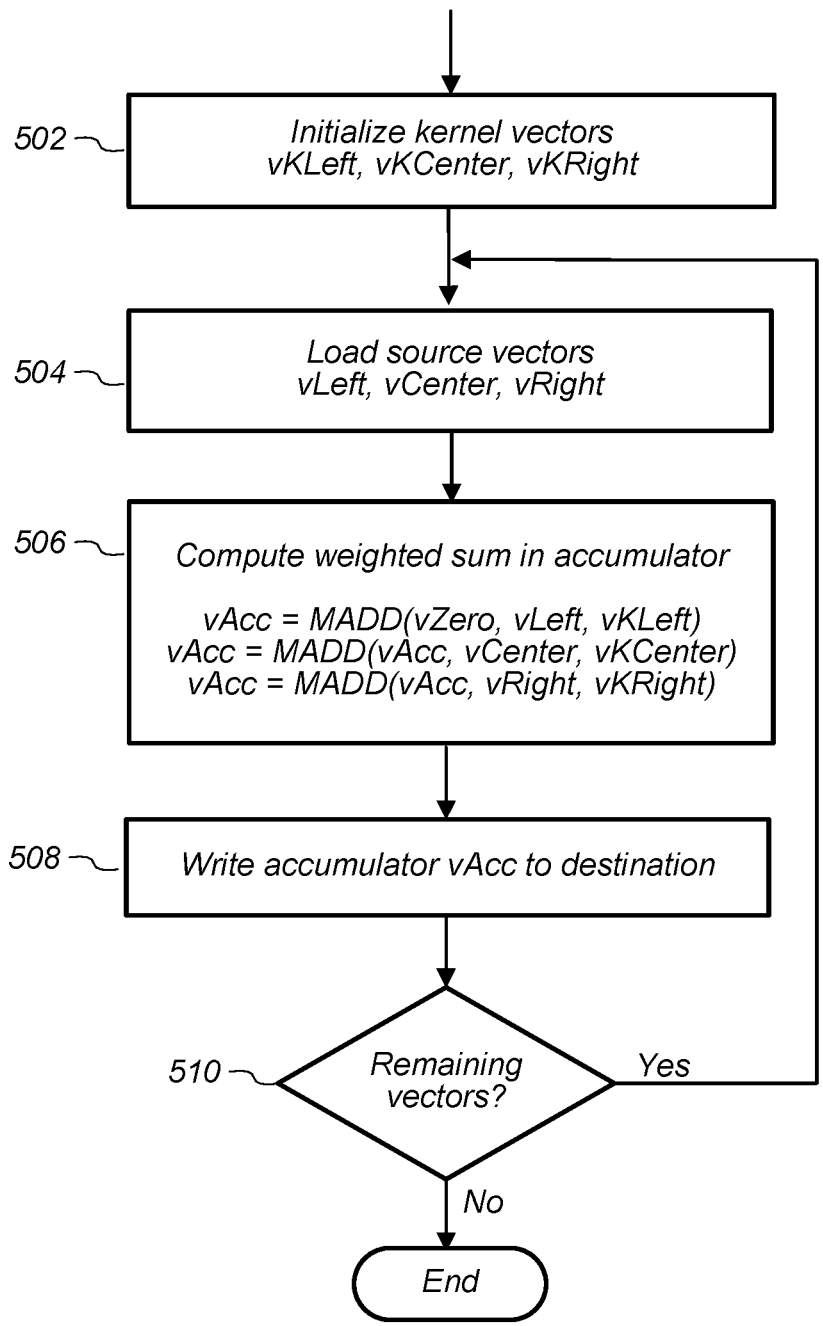
FIG. 5 is a flow diagram illustrating one embodiment of a method for computing a series of output vectors of a data set comprising a three element, one-dimensional convolution of an input data set.

FIG. 5 is a flow diagram demonstrating a one dimensional, three element convolution of multiple data vectors according to some embodiments. The method begins with step 502 which initializes three kernel vectors, vKLeft, vKCenter and vKRight corresponding to Kernel Vectors 410 of FIG. 4. As these vectors remain constant for the duration of the convolution operation, they may be loaded only once.

The method proceeds to step 504 which loads the aligned and shifted source vectors vLeft, vCenter, and vRight corresponding to the Vectors 400 in FIG. 4. In some embodiments, vLeft, vCenter, and vRight may be loaded from pre-shifted data sets such as those shown in FIG. 3 while in other embodiments they may be loaded through other means.

The method then proceeds to steps 506 which performs the three weighted sums added to vector accumulator vAcc.

Each weighted value is computed using a Multiply-and-Add vector instruction common to many SIMD architectures although in some embodiments it may be implemented using a combination of arithmetic vector instructions. In step 506 the Multiply-and-Add vector instruction is represented by the MADD operation which takes three operands: the first operand is the base vector, the second operand is the source vector, and the third operand is the kernel vector. The MADD operation multiplies the second and third operands then adds the product to the first operand and returns a result vector. In the first MADD operation the base vector specified, vZero, corresponds to a vector containing 0 values in all data lanes and is common to many SIMD architectures. Using vZero in this manner provides an efficient means of initializing the vector accumulator vAcc although in some alternate embodiments, with SIMD architectures that do not offer an equivalent vZero vector, the vector accumulator vAcc may first be initialized by an alternative means. In the remaining two MADD operations, the base vector specified is the accumulator vAcc. The three source vectors, vLeft, vCenter and vRight, are multiplied by their respective kernel vectors, vKLeft, vKCenter, and vKRight, and added to the accumulator vAcc.

Once the MADD operations are completed, the method proceeds to step 508 where the accumulator vector is written to the destination address. The number of remaining vectors is checked in step 510 and the process continues at step 504 until all vectors have been generated.

While the embodiment disclosed in FIG. 5 performs a one-dimensional convolution with a three element kernel, it should be understood that the embodiment is not intended to be limited to three elements but may include a variety of kernel widths. While the embodiment on FIG. 5 implements an efficient computation of weighted sums, it relies on pre-shifted source data, such as those shown in FIG. 3, and for wider kernel widths, the use of these pre-shifted data sets results in larger demands on memory and off-chip bandwidth. For this reason, a vector instruction to derive the shifted source data is disclosed in FIG. 6A. The use of this vector instruction, when combined with the embodiment of FIG. 5, minimizes off-chip bandwidth requirements, particularly with wider kernel widths.

In some embodiments, an Extract vector instruction may be used to generate the shifted data vectors required for the convolution computations using a pair of aligned source vectors. The use of the Extract vector instruction allows the of source data as originally supplied for a convolution operation, thus enabling efficient use of memory and cache bandwidth. FIG. 6A illustrates an example of such an Extract vector instruction 620. In FIG. 6A, two consecutive source vectors, 600A and 600B, are concatenated and subset of the resulting double-width vector is extracted starting at an offset data lane specified by Shift 605 to produce the Output Vector 610. Optionally, and Output Width 615 may he specified which allows for the Output Vector to contain less than the full vector width of output data lanes. In this case, the rightmost lanes of the Output Vector 610 will contain zero. In FIG. 6A, a vector width of eight data lanes is shown with a Shift 605 value of four and an Output Width 615 value of six.

Using the Extract vector instruction, various embodiments of convolution operations may load shifted source vectors for a wide variety of kernel widths using only three aligned source vectors, the center aligned vector and an aligned vector to the immediate left and immediate right of the center aligned vector.

FIG. 6B illustrates the loading of source vectors for a one dimensional, three element convolution such as shown in FIG. 4. Three aligned source vectors are loaded, a center source vector 625B, a source vector immediately to the left of the center vector 625A, and a source vector immediately to the right of the center vector 625C. An Extract Left operation 630 is performed using the left and center source vectors, 625A and 625B, and the Extract vector instruction 620 of FIG. 6A using a shift value of equal to the number of data lanes in the vector, eight in the example, minus one. This operation results in the Left Vector 650. Likewise, an Extract Right operation 640 is performed using the center and right source vectors, 625B and 625C, and the Extract vector instruction 620 of FIG. 6A using a shift value of one. This operation results in the Right Vector 670. The set of vectors 650, 660 and 670 may then be used in a convolution such as illustrated in FIG. 5. Those skilled in the art will recognize that the method illustrated in FIG. 6B is not intended to be limited to a three element convolution operation but may be used to generate vectors required to perform convolutions for a variety of kernel widths, often without the need to load additional source vectors 625 beyond those illustrated in FIG. 6B. Furthermore, use of the Extract vector instruction 620 eliminates the need for pre-shifted data such as illustrated in FIG. 3, this eliminating growth in data size for the convolution operation.

Figure 7:
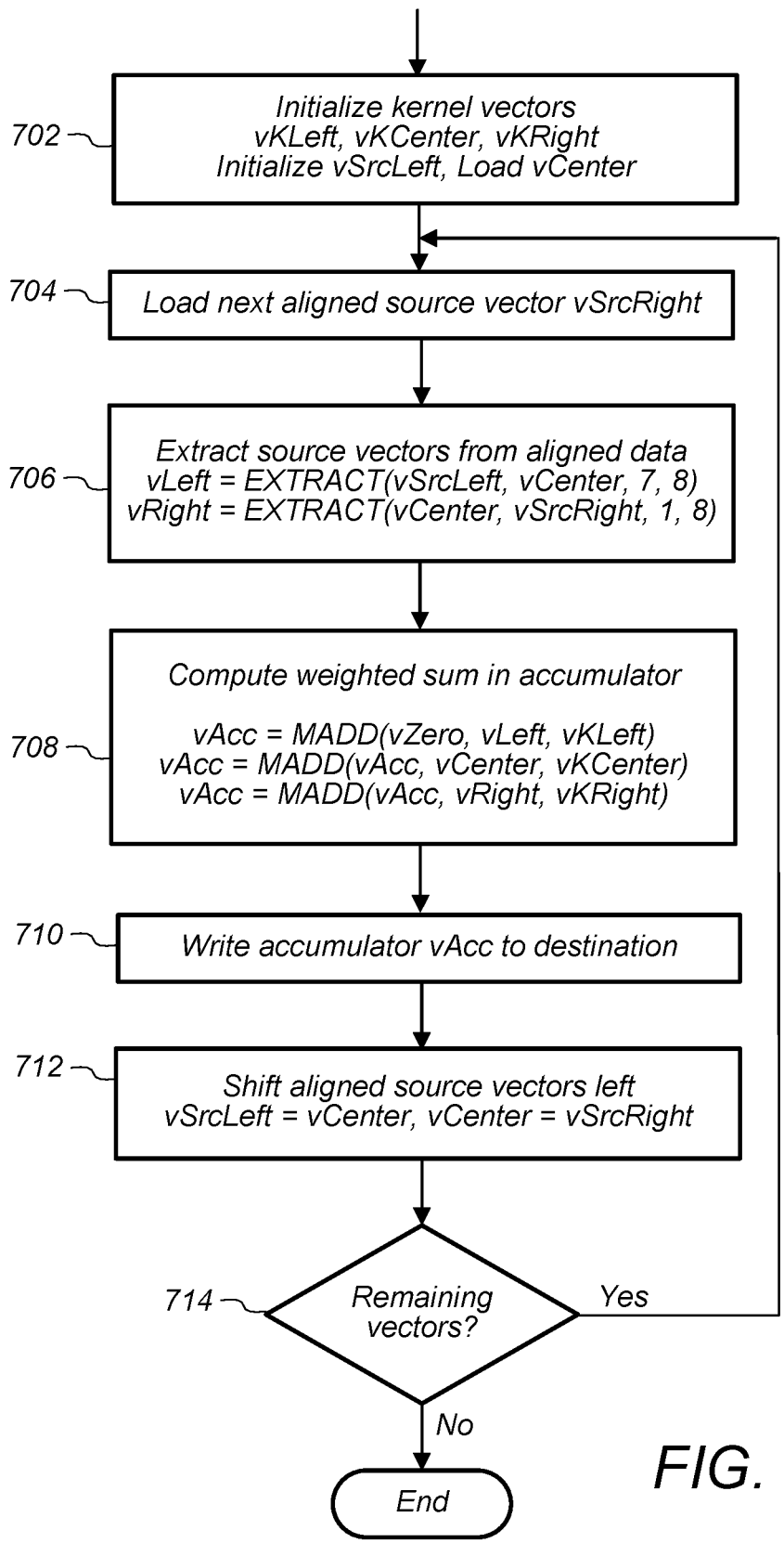
FIG. 7 is a flow diagram illustrating one embodiment of a method for computing a series of output vectors of a data set comprising a three element, one-dimensional convolution of an input data set and using the Extract vector instruction of FIG. 6A.

FIG. 7 is a flow diagram demonstrating a one dimensional, three element convolution of multiple data vectors using the Extract method of FIG. 6B according to some embodiments. The convolution of FIG.7 minimizes the number of loads and stores of vector data to main memory and uses the original source data without and precomputing of vector data. Furthermore, the sequence of loads and stores to main memory enables high performance of system caches, resulting in a high performance convolution implementation that balances computational demands with cache and memory bandwidth.

The method begins with step 702 which initializes three kernel vectors, vKLeft, vKCenter and vKRight corresponding to Kernel Vectors 410 of FIG. 4. As these vectors remain constant for the duration of the convolution operation, they may be loaded only once. Additionally, the left-aligned source vector, vSrcLeft, is initialized and the first source vector is loaded into vCenter.

The method proceeds to step 704 which loads the right-aligned source vector vSrcRight. As vSrcLeft and vCenter are already loaded, once vSrcRight, is loaded the method proceeds to steps 706 where the Extract vector instruction 620 is used to produce the left- and right-shifted vectors, vLeft and vRight, for the convolution computation. In step 706 the Extract vector instruction 620 is represented by the EXTRACT operation which takes four operands: the first and second operands are the source vectors, the third operand is the shift value, and the fourth operand is the output width. Steps 706 produces the left- and right-shifted source vectors vLeft and vRight that, when combined with the center vector vCenter, form the vectors used to perform the convolution.

The method then proceeds to steps 708 which performs the three weighted sums added to vector accumulator vAcc. Each weighted value is computed using a Multiply-and-Add vector instruction common to many SIMD architectures although in some embodiments it may be implemented using a combination of arithmetic vector instructions. In step 708 the Multiply-and-Add vector instruction is represented by the MADD operation which takes three operands: the first operand is the base vector, the second operand is the source vector, and the third operand is the kernel vector. The MADD operation multiplies the second and third operands then adds the product to the first operand and returns a result vector. In the first MADD operation the base vector specified, vZero, corresponds to a vector containing 0 values in all data lanes and is common to many SIMD architectures. Using vZero in this manner provides an efficient means of initializing the vector accumulator vAcc although in some alternate embodiments, with SIMD architectures that do not offer an equivalent vZero vector, the vector accumulator vAcc may first be initialized by an alternative means. In the remaining two MADD operations, the base vector specified is the accumulator vAcc. The three source vectors, vLeft, vCenter and vRight, are multiplied by their respective kernel vectors, vKLeft, vKCenter, and vKRight, and added to the accumulator vAcc.

Once the MADD operations are completed, the method proceeds to step 710 where the accumulator vector is written to the destination address. In step 712, the vCenter and vSrcRight vectors are shifted to become the vSrcLeft and vCenter vectors, respectively, then the number of remaining vectors is checked in step 714 and the process continues at step 704 until all vectors have been generated.

In some embodiments, a Scalar Multiply-and-Add vector instruction may be used. In a traditional Multiply-and-Add vector instruction, two vectors are multiplied and the product added to a third vector to produce an output vector. In the disclosed Scalar Multiply-and-Add vector instruction 860 shown in FIG. 8, each lane of a Source Vector 800 is multiplied by a scalar quantity specified by Lane 820 of a Kernel Vector 810 to form a Scaled Vector 830 which is added to a Base Vector 840 to produce an Output Vector 850. Using this vector instruction allows the weighting coefficients of the convolution kernel to be stored compactly in individual lanes of vectors rather than using a vector for each weighting coefficient. This reduces usage of the register file 114 as well as off-chip bandwidth requirements.

Figure 8:
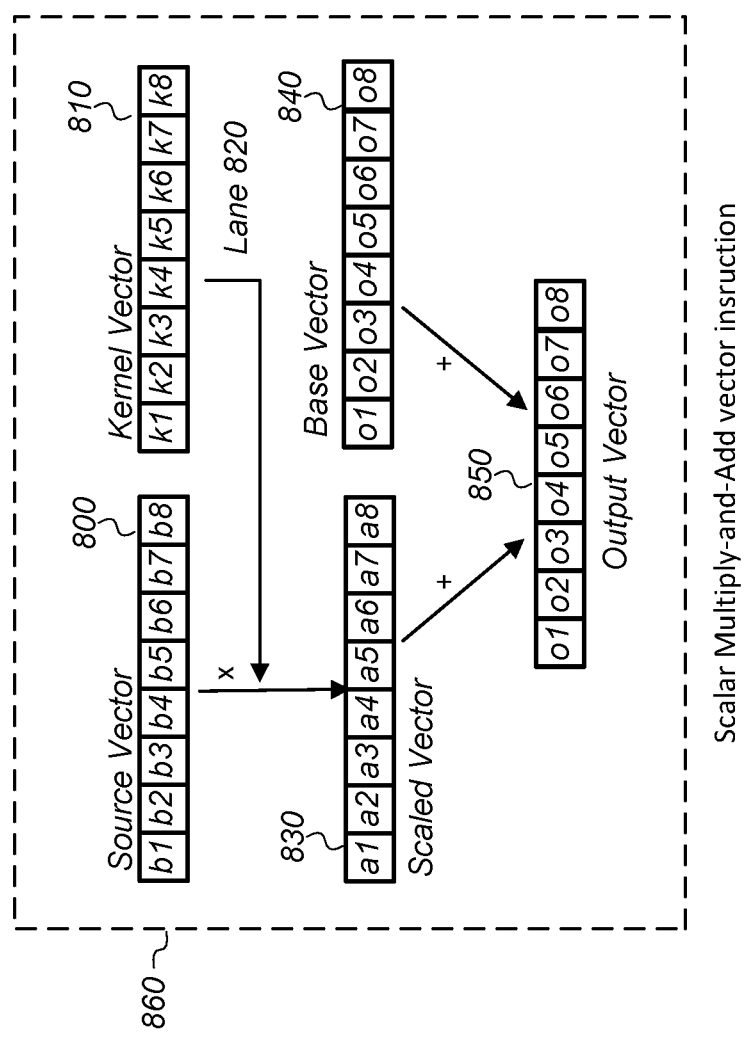
FIG. 8 illustrates a Scalar Multiply-and-Add vector instruction that derives a scalar value, scales each of the data lanes of a vector by the scalar value to produce a scaled vector, and adds the scaled vector to a base vector to generate an output vector.
Figure 9:
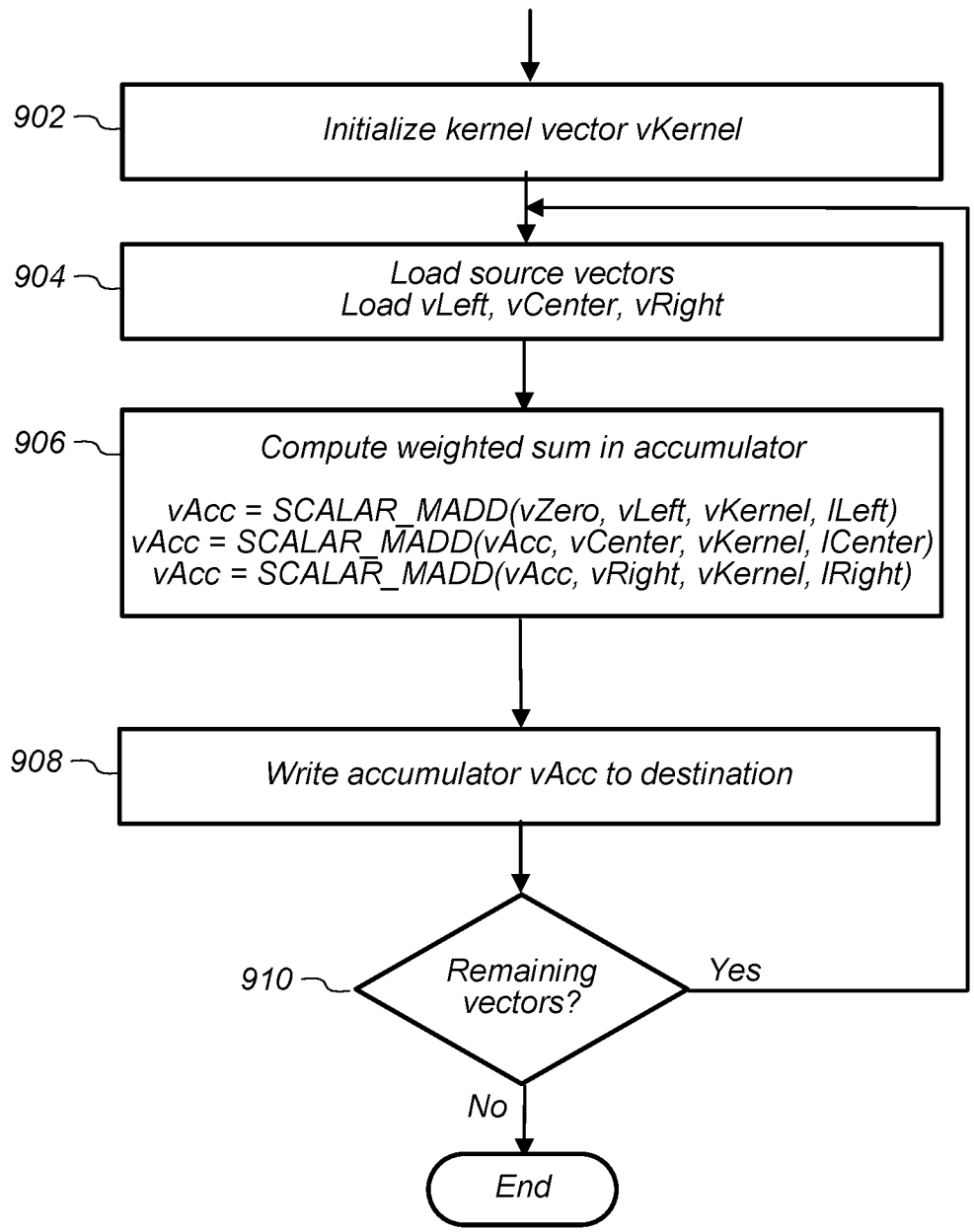
FIG. 9 is a flow diagram illustrating one embodiment of a method for computing a series of output vectors of a data set comprising a three element, one-dimensional convolution of an input data set and using the Scalar Multiply-and-Add vector instruction of FIG. 8.

FIG. 9 is a flow diagram demonstrating a one dimensional, three element convolution of multiple data vectors using the Scalar Multiply-and-Add vector instruction 860 of FIG. 8 according to some embodiments. The method begins with step 902 which initializes a single kernel vector, vKernel, with weighting coefficients in various lanes of the vector. As this vector remains constant for the duration of the convolution operation, it may be loaded only once.

The method proceeds to step 904 which loads the aligned and shifted source vectors vLeft, vCenter, and vRight corresponding to the Vectors 400 in FIG. 4. In some embodiments, vLeft, vCenter, and vRight may be loaded from pre-shifted data sets such as those shown in FIG. 3 while in other embodiments they may be loaded through other means such as using the Extract vector instruction 620 and method as shown in FIG. 6A and FIG. 6B.

The method then proceeds to steps 906 which performs the three weighted sums for vector accumulator vAcc. Each weighted value is computed using the Scalar Multiply-and-Add vector instruction 860 of FIG. 8. In step 906 the Scalar Multiply-and-Add vector instruction 860 is represented by the SCALAR_MADD operation which takes four operands: the first operand is the base vector, the second operand is the source vector, the third operand is the kernel vector, and the fourth operand is the lane of the kernel vector containing the scaling coefficient. The SCALAR_MADD operation multiplies each lane of the second operand by the lane specified by the third and fourth operands then adds the product to the first operand and returns a result vector. In the first SCA-LAR_MADD operation, the base vector specified, vZero, corresponds to a vector containing 0 values in all data lanes and is common to many SIMD architectures. Using vZero in this manner provides an efficient means of initializing the vector accumulator vAcc although in some alternate embodiments, with SIMD architectures that do not offer an equivalent vZero vector, the vector accumulator vAcc may first be initialized by an alternative means. In the remaining two SCALAR_MADD operations, the base vector specified is the accumulator vAcc. The three source vectors, vLeft, vCenter and vRight, are multiplied by their respective kernel scalar values loaded from respective data lanes of the kernel vector, vKernel, and added to the accumulator vAcc.

Once the SCALAR_MADD operations are completed, the method proceeds to step 908 where the accumulator vector is written to the destination address. The number of remaining vectors is checked in step 910 and the process continues at step 904 until all vectors have been generated.

While the embodiment disclosed in FIG. 9 performs a one-dimensional convolution with a three element kernel, it should be understood that the embodiment is not intended to be limited to three elements but may include a variety of kernel widths. Furthermore, while the various embodiments discussed previously have implemented one-dimensional convolution operations, it should be understood that the methods discussed may be applied to multi-dimensional convolution operations as well. In the case of a multi-dimensional convolution, a set of source vectors such as shown in FIG. 4 may be applied simultaneously to multiple accumulator vectors to implement a multi-dimensional convolution.

Figure 10:
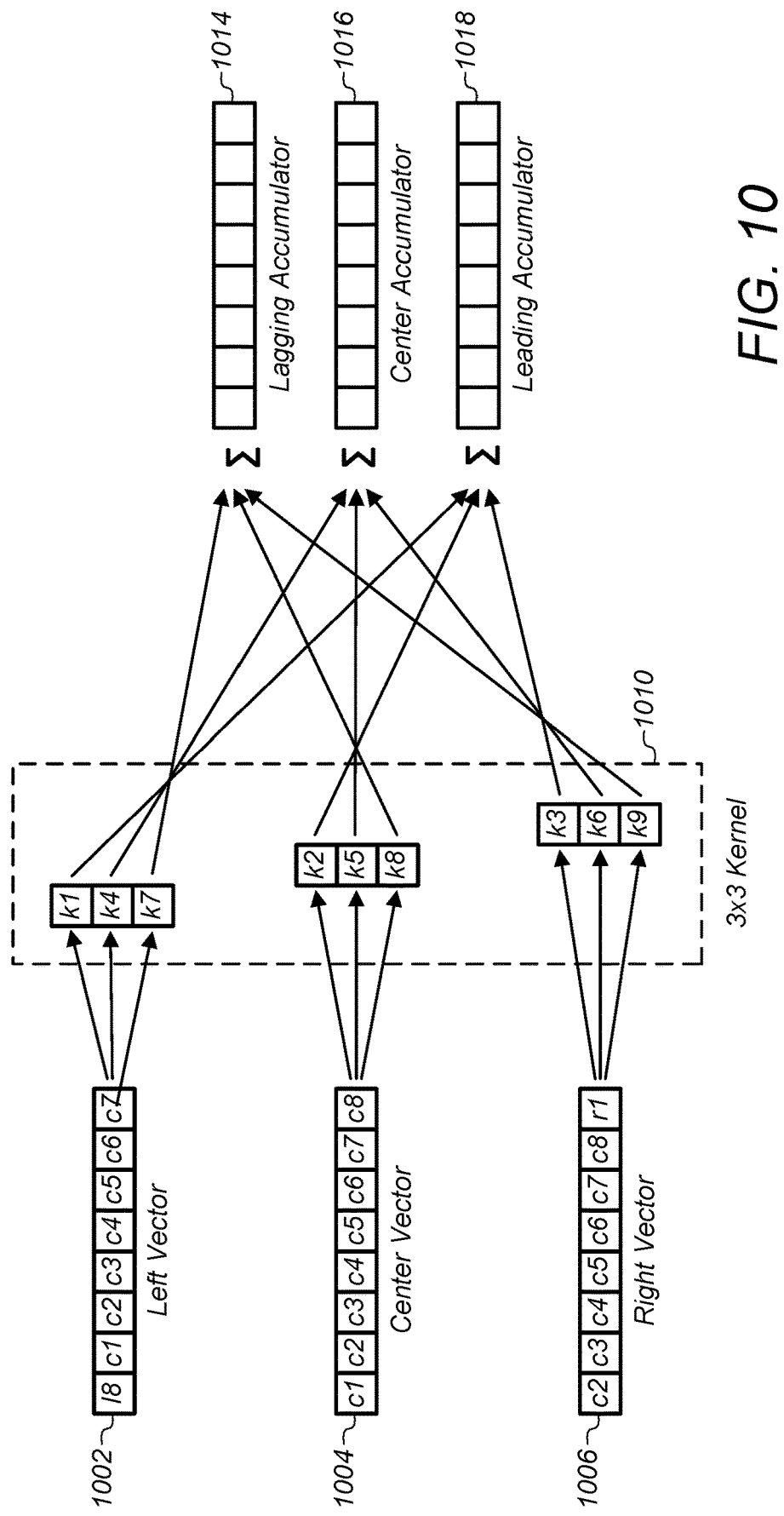
FIG. 10 illustrates the partial computing of a plurality of output vectors for a 3×3 element, two-dimensional convolution using aligned, left-shifted and right-shifted source vectors with respective kernel vectors, according to at least some embodiments.

FIG. 10 illustrates the partial computation of convolution output vectors using a two-dimensional 3×3 element convolution kernel given pre-shifted source vectors. The pre-shifted source vectors, including Left Vector 1002, Center Vector 1004 and Right Vector 1006, may be loaded from pre-shifted data sets such as illustrated in FIG. 3 in some embodiments or may be loaded using a variety of other methods including using the Extract vector instruction 620 and method as shown in FIG. 6A and FIG. 6B. The various weighting coefficients of the 3×3 Kernel 1010 may be stored in some embodiments as Kernel Vectors 410 as shown in FIG. 4 or stored in other embodiments as individual data lanes of Kernel Vectors for use with the Scalar Multiply-and-Add vector instruction 860 of FIG. 8. The Left, Center and Right Vectors 1002, 1004 and 1006 have respective left, center and right columns in the 3×3 Kernel 1010 where each column comprises three rows of weighting coefficients. Each row of the 3×3 Kernel 1010 has a respective accumulator vector, the Leading Accumulator 1018 for the first row, the Center Accumulator 1016 for the second row, and the Lagging Accumulator 1014 for the third row.

A Multiply-and-Add vector instruction is executed three times for each of the source vectors 1002, 1004 and 1006, one time for each of the three accumulator vectors. This results in a total of nine Multiply-and-Add vector instructions, one for each of the kernel weighting coefficients. For each Multiply-and-Add vector instruction, the row and column of the Kernel is selected based on the respective source and accumulator vectors of the operation. The Leading Accumulator 1018 is thus the weighted sum of the Left Vector 1002 using coefficient k1, the Center Vector 1004 using coefficient k2 and the Right Vector 1006 using coefficient k3. Likewise, the Center Accumulator 1016 is the weighted sum of the Left Vector 1002 using coefficient k4, the Center Vector 1004 using coefficient k5 and the Right Vector 1006 using coefficient k6. Finally, the Lagging Accumulator 1014 is the weighted sum of the Left Vector 1002 using coefficient k7, the Center Vector 1004 using coefficient k8 and the Right Vector 1006 using coefficient k9.

FIG. 10 illustrates only the partial computation of output vectors for a single set of source vectors. For a complete computation of each output vector, the weighted sums of vectors immediately above and below each destination vector must also be performed. By iterating the method illustrated in FIG. 10 over columns of source data, complete convolution computations may be performed while loading each source vector, along with its associated left- and right-shifted vectors, only once.

While FIG. 10 illustrates a convolution computation with a 3×3 convolution kernel for simplicity, those skilled in the art will recognize that the computation shown is not limited to either three rows or three columns but may be used to support other numbers of rows, columns, or rows and columns. Furthermore, the computation shown is not intended to be limited to two dimensional convolution operations but may be employed to perform convolutions of greater than two dimensions.

Figure 11:
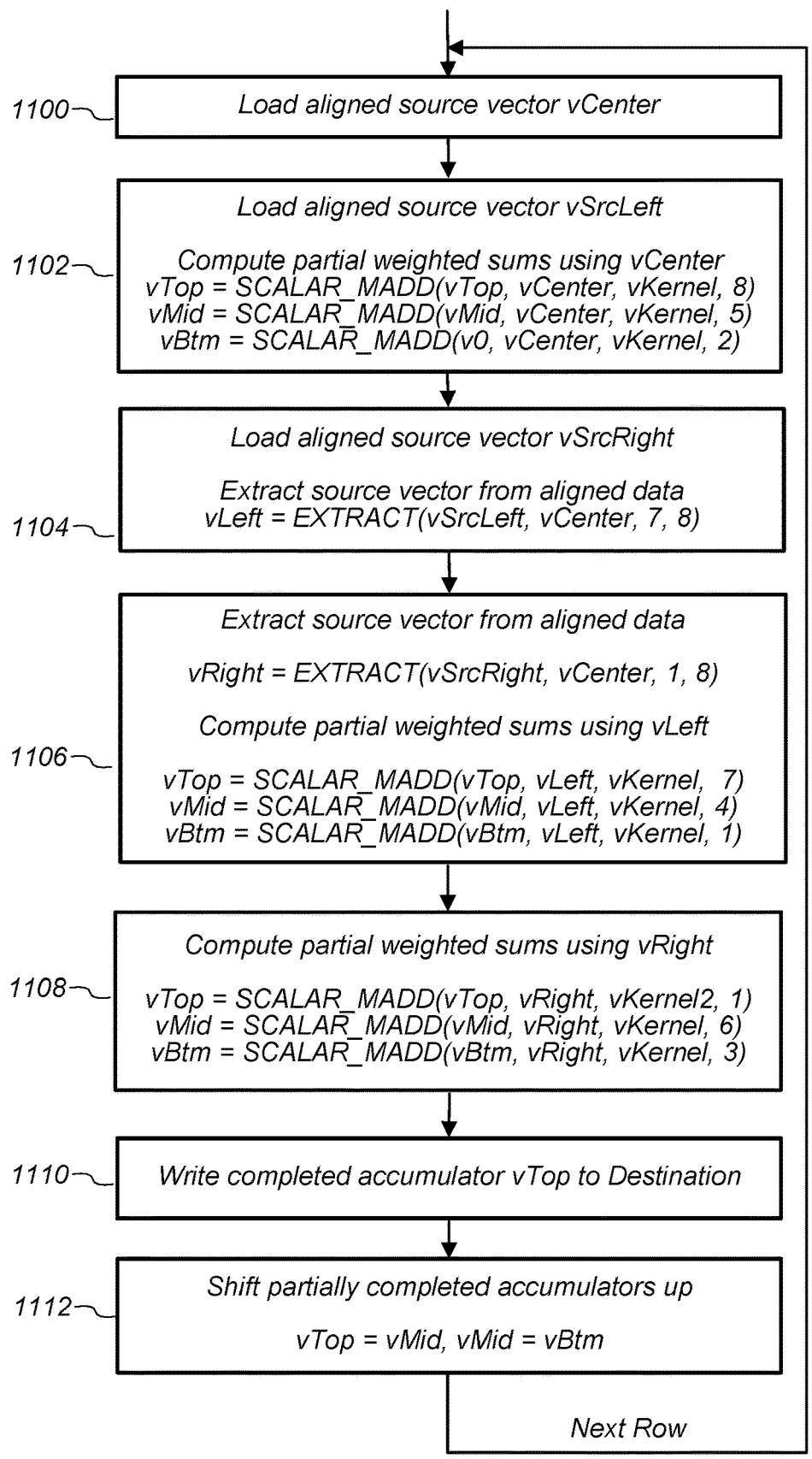
FIG. 11 is a flow diagram illustrating one embodiment of a method for computing a column of output vectors of a data set comprising a 3×3 element, two-dimensional convolution of an input data set and using the Scalar Multiply-and-Add vector instruction of FIG. 8 and the Extract vector instruction of FIG. 6A.

FIG. 11 is a flow diagram demonstrating a portion of a two dimensional, three element convolution of multiple data vectors using the Scalar Multiply-and-Add vector instruction 860 of FIG. 8 and the Extract vector instruction 620 of FIG. 6A according to some embodiments. The method assumes that kernel vectors vKernel and vKernel2 have already been initialized with weighting coefficients. In this example, vectors are assumed to contain eight lanes of data whereas nine weighting coefficients are required so two kernel vectors are used, though those skilled in the art will recognize that more or fewer kernel vectors may be used depending on vector and convolution kernel configurations. The method begins with step 1100 which loads the center source vector, vCenter. Once this vector is loaded, it is immediately available for convolution computations.

The method then proceeds to step 1102 which performs two functions. First, the left aligned source vector is loaded. Once this vector is loaded, it may be combined with vCenter to produce the left-shifted vector, vLeft. Second, the vCenter vector loaded in the previous step is used to perform weighted sum computations using the Scalar Multiply-and-Add vector instruction 860 of FIG. 8.

The Scalar Multiply-and-Add vector instruction 860 is represented by the SCALAR_MADD operation which takes four operands: the first operand is the base vector, the second operand is the source vector, the third operand is the kernel vector, and the fourth operand is the lane of the kernel vector containing the scaling coefficient. The SCALAR_MADD operation multiplies each lane of the second operand by the lane specified by the third and fourth operands then adds the product to the first operand and returns a result vector.

The vTop and vMid accumulator vectors may have partial results from previous iterations of the method and are, therefore, not initialized. The vBtm accumulator, however, must be initialized. The base vector specified in the vBtm computation of step 1102, vZero, corresponds to a vector containing 0 values in all data lanes and is common to many SIMD architectures. Using vZero in this manner provides an efficient means of initializing the vector accumulator vBtm although in some alternate embodiments, with SIMD architectures that do not offer an equivalent vZero vector, the vector accumulator may first be initialized by an alternative means. Step 1102 uses the SCALAR_MADD operation to compute three partial sums using the vCenter source vector and three weighting values corresponding to the center column of the 3×3 convolution kernel.

The method then proceeds to step 1104 which loads the vSrcRight source vector. Step 1104 also loads the vLeft vector using the vSrcLeft and vCenter vectors already loaded as well as the Extract vector instruction 620 of FIG. 6A. The Extract vector instruction 620 is represented by the EXTRACT operation which takes four operands: the first and second operands are the source vectors, the third operand is the shift value, and the fourth operand is the output width.

The method then proceeds to step 1106 which loads the vRight vector using the vCenter and vSrcRight vectors already loaded as well as the Extract vector instruction 620 of FIG. 6A. Additionally, the vLeft vector loaded in step 1104 is used to perform weighted sum computations using the Scalar Multiply-and-Add vector instruction 860 of FIG. 8 using three weighting values corresponding to the left column of the 3×3 convolution kernel.

The method then proceeds to step 1108 where the vRight vector loaded in step 1106 is used to perform weighted sum computations using the Scalar Multiply-and-Add vector instruction 860 of FIG. 8 using three weighting values corresponding to the right column of the 3×3 convolution kernel.

The method then proceeds to step 1110 where the partial sums for source vectors have been completed for the source row. At this point, the accumulator vTop will have all rows completed and may be written to the destination vector. The method the proceeds to step 1112 where the remaining two accumulators, vMid and vBtm, are shifted into the vTop and vMid positions, respectively in preparation for the next computation row.

While the flow diagram of FIG. 11 illustrates a convolution computation with a 3×3 convolution kernel for simplicity, those skilled in the art will recognize that the computation shown is not limited to either three rows or three columns but may be used to support other numbers of rows, columns, or rows and columns. Furthermore, the computation shown is not intended to be limited to two dimensional convolution operations but may be employed to perform convolutions of greater than two dimensions.

While the various embodiments of convolution operations discussed herein may be applied in great variety of applications, the various embodiments may be especially useful when applied to machine learning and deep neural networks. In these applications, the convolution step is recognized as a significantly time intensive and resource inefficient operation. As a result, processors may be tailored to accelerate this operation. Convolution stages are increasingly added to a wide variety of Deep Neural Networks (DNNs), including Convolution Networks (D-CNNs), Recurrent Neural Networks such as LSTMs, Generative Adversarial (GANs), etc. By performing direct convolution operations using SIMD instructions available on general purpose CPU cores, convolutions may be performed that are as efficient or more efficient that possible using specialized spatial convolutional neural network hardware while fitting into a conventional processor pipeline and thus minimizing or eliminating extra hardware. Furthermore, as convolutions in these applications are often employed repeatedly for a given data set using many, small convolution kernels, this approach enables excellent processor utilization as individual convolution operations can be dedicated to individual processor cores, allowing systems to scale well merely by adding additional processor resources. Finally, the various embodiments of SIMD instructions described herein may provide benefits to a large range of operations beyond convolution.

In some embodiments, a stride may be employed to reduce the computational demands and output size of a convolution operation. In this case, the stride value specifies how many data elements may be skipped for every data element computed. For example, when a stride of two is employed, every other data element is skipped and only half of the data elements are computed. For multi-dimensional convolutions dimensions, strides may be efficiently employed by skipping rows of data elements, but for one-dimensional convolutions in the various embodiments described herein, stride factors would serve to lower the utilization of the arithmetic logic units of the execution core. For this reason, shuffled data sets may be employed to enable use of the otherwise unutilized data lanes of the vector instructions. In this case, the various embodiments of a Shuffle vector instruction are disclosed that enable shuffled source data vectors to be loaded for implementation of convolutions with stride values greater than one.

Figure 12A:
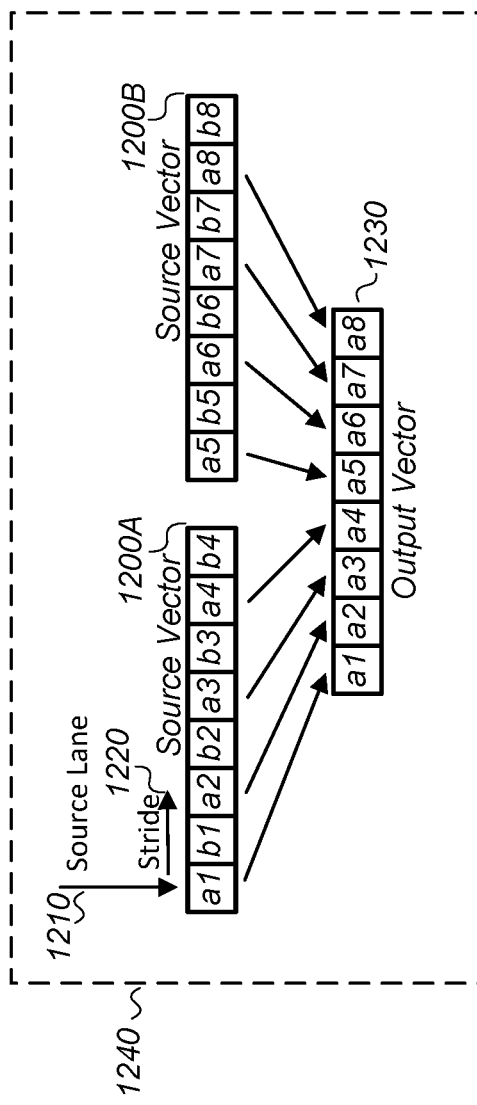
FIG. 12A illustrates one embodiment of a Shuffle vector instruction that generates a data vector comprising Shuffled data lanes of the concatenation of multiple interlaced source vectors including a stride factor and starting source lane.

FIG. 12A illustrates an example of such a Shuffle vector instruction 1240 according to some embodiments. In FIG. 12A, source vectors 1200, such as 1200A and 1200B, are concatenated and a subset of the resulting vector is extracted, starting with Source Lane 1210 and implementing a stride value specified by Stride 1220. The result is written to the Output Vector 1230. The number of source vectors 1200 required will be equal to the Stride 1220, resulting in an Output Vector comprising data elements in all data lanes. In some embodiments, each of the source vectors 1200 may be specified using instruction operands. In other embodiments, the source vectors 1200 may be specified using operands specifying a range of vectors.

Figure 12B:
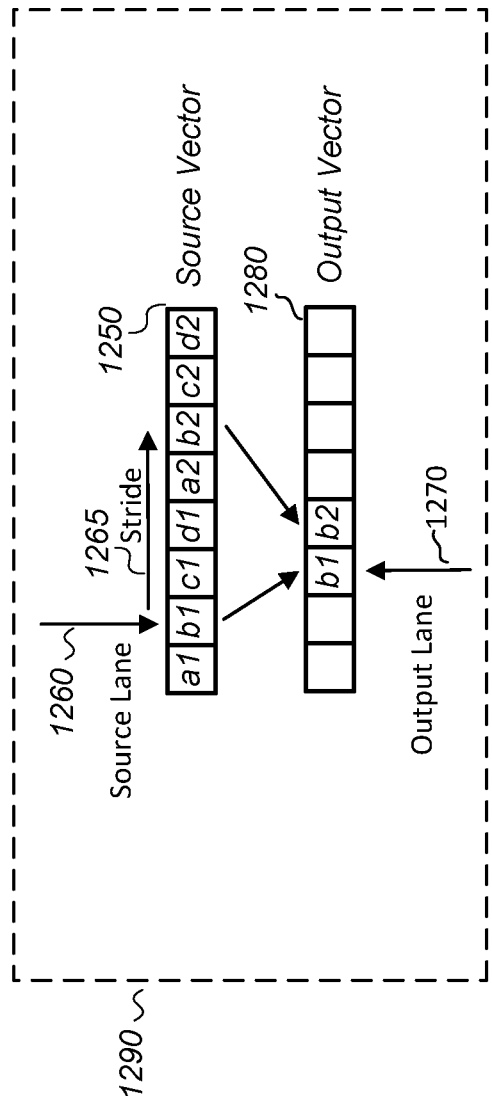
FIG. 12B illustrates one embodiment of a Shuffle vector instruction that generates a data vector comprising del-interlaced data lanes from an interlaced source vector including a stride factor, starting source lane, and starting output lane.

FIG. 12B illustrates another example of a Shuffle vector instruction 1290 according to some embodiments. In FIG. 12B a fixed number of source vectors 1250, comprising one or more vectors, are concatenated and subset of the resulting vector is extracted, starting with Source Lane 1260 and implementing a stride value specified by Stride 1265. The result is written to the Output Vector 1280. As the number of source vectors 1250 is fixed and may be less than the Stride 1265, the Output Vector may comprise only a contiguous subset of all data lanes. For this reason, an additional operand may be provided to specify the first Output Lane 1270 to extract the output data lanes.

Figure 13:
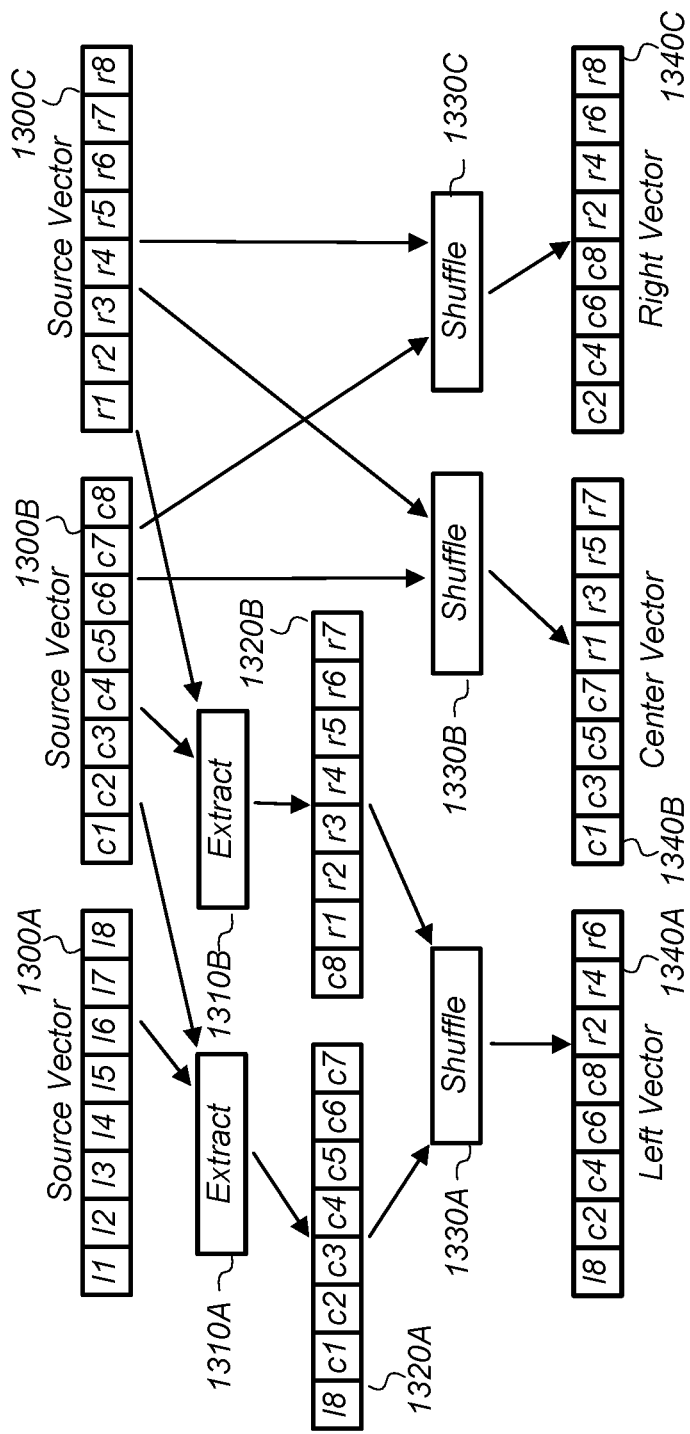
FIG. 13 illustrates the use of the Extract vector instruction of FIG. 6A and the Shuffle vector instruction of FIG. 12A to load a set of source vectors for a convolution operation including a stride value of two and using a set of aligned, sequential source input vectors, according to at least some embodiments.

FIG. 13 illustrates the loading of source vectors for a one dimensional, three element convolution including a stride value of two. Three aligned source vectors are loaded, a center source vector 1300B, a source vector immediately to the left of the center vector 1300A, and a source vector immediately to the right of the center vector 1300C. An extract operation 1310A is performed using the left and center source vectors, 1300A and 1300B, and the Extract vector instruction 620 of FIG. 6A using a shift value of equal to the number of data lanes in the vector, eight in the example, minus one. Likewise, an Extract operation 1310B is performed using the center and right source vectors, 1300B and 1300C, and the Extract vector instruction 620 of FIG. 6A using a shift value of one. The extract operations 1310A and 1310B result in intermediate source vectors 1320A and 1320B which are then input into the Shuffle operation 1330A. The Shuffle operation 1330A employs the Shuffle vector instruction 1240 of FIG. 12A with a Source Lane 1210 value of zero and a Stride 1220 value of two to produce the Left Vector 1340A comprising alternating data lanes of the original Source Vectors 1300 starting with data lane 18 of Source Vector 1300A.

The source vectors 1300B and 1300C are then input to Shuffle operations 1330B and 1330C. Shuffle operation 1330B employs the Shuffle vector instruction 1240 of FIG. 12A with a Source Lane 1210 value of zero and a Stride 1220 value of two to produce the Center Vector 1340B while Shuffle operation 1330C employs the Shuffle vector instruction 1240 of FIG. 12A with a Source Lane 1210 value of one and a Stride 1220 value of two to produce the Right Vector 1340B. Center Vector 1340B thus comprises alternating data lanes of the original Source Vectors 1300 starting with data lane c1 of Source Vector 1300B while Right Vector 1340C comprises alternating data lanes of the original Source Vectors 1300 starting with data lane c2 of Source Vector 1300B.

The set of vectors 1340 may then be used in a convolution such as illustrated in FIG. 5 or combined with the method shown in FIG. 11 to implement a multi-dimensional convolution with stride. Those skilled in the art will recognize that the method illustrated in FIG. 13 is not intended to be limited to a three element convolution operation nor a stride value of two but may be used to generate vectors required to perform convolutions for a variety of kernel widths and stride values, often without the need to load additional source vectors 1300 beyond those illustrated in FIG. 13. Those skilled in the art will also recognize that embodiments implementing kernel widths greater than three and/or strides greater than two may require additional source vectors 1300 beyond those shown in FIG. 13 as well as additional extract operations 1310 are required by those particular embodiments. Use of the Extract vector instruction 620 and Shuffle vector instruction 1240 or 1290 eliminates the need for pre-shifted data such as illustrated in FIG. 3, thus eliminating growth in data size for the convolution operation implementing the stride feature.

What is claimed:

1. A system, comprising:
   a processor configured to perform a convolution on a vector comprising a plurality of data lanes of multiple data bits, wherein to perform the convolution on the vector the processor is configured to execute a plurality of vector instructions, wherein each of the plurality of vector instructions is configured to perform an operation on a plurality of data lanes of multiple data bits, and wherein the plurality of vector instructions are configured to:
   load into respective different vector registers of the processor:
   three or more source vectors comprising:
   a center vector comprising a contiguous plurality of data lanes of the vector starting with a first data lane of the vector;
   a left vector comprising a contiguous plurality of data lanes of the vector starting one data lane prior to the first data lane of the vector; and
   a right vector comprising a contiguous plurality of data lanes of the vector starting one data lane after the first data lane of the vector; and
   a kernel vector comprising a plurality of weighting values including a center weighting value, a left weighting value and a right weighting value; and
   subsequent to the loading, generate one or more output vectors respectively comprising weighted sums of the three or more source vectors loaded into the respective different vector registers, wherein to generate a particular output vector of the one or more output vectors a particular vector instruction of the plurality of vector instructions is configured to:
   load a scalar weighting value from a lane of the kernel vector, the lane specified to the particular vector instruction according to the particular output vector and a particular source vector of the three or more source vectors, wherein the particular source vector is specified as an operand of the particular vector instruction;

scale respective ones of a plurality of data lanes of the particular source vector by the loaded scalar weighting value to generate a scaled vector;

add the scaled vector to an accumulator vector stored in a vector accumulator to generate an output vector; and store the output vector in the vector accumulator.

2. The system of claim 1, wherein to load the left and right vectors the plurality of vector instructions are configured to:

load a previous vector immediately prior to the vector;

load a next vector immediately subsequent to the vector;

execute a vector extraction instruction to generate the left vector using the previous vector and the vector; and execute another vector extraction instruction to generate the right vector using the vector and the next vector.

3. The system of claim 2, wherein the vector extraction instruction is configured to:

concatenate a first vector register with a second vector register to produce an intermediate result;

shift the intermediate result left a number of lanes; and generate an output vector comprising an upper portion of the intermediate result.

4. The system of claim 1:

wherein to generate the particular output vector, the plurality of vector instructions comprise a vector scaling instruction for each one of the three or more source vectors, wherein each one of the three or more source vectors is configured to:

load a weighting value for the convolution from a specified lane of a register containing the kernel vector;

multiply each of a plurality of data lanes of a vector register specified as an operand of the vector scaling instruction by the weighting value to generate a scaled vector; and add the scaled vector to the particular one of the one or more the output vectors.

5. The system of claim 1, wherein the convolution on the vector implements a stride value, wherein a value of data lanes to omit in the convolution for each data lane to include is based on the stride value, and wherein to load the three or more source vectors the plurality of vector instructions are configured to:

load a previous vector immediately prior to the vector;

load a next vector immediately subsequent to the vector;

execute vector extraction instructions to generate first and second intermediate vectors using the previous vector, the vector and the next vector;

execute a vector shuffle instruction to load the left vector using the first and second intermediate vectors; and execute vector shuffle instructions to load the center vector and right vector using the vector and next vector.

6. The system of claim 1, wherein the convolution is a multi-dimensional convolution, and wherein the one or more output vectors comprises a plurality of output vectors.

7. The system of claim 1, wherein the processor is configured to perform the convolution as part of a convolutional neural network.

8. A method, comprising:

performing, by a computer comprising a processor implementing vector instructions, a convolution on a vector comprising a plurality of data lanes of multiple data bits, comprising:

loading into different vector respective registers of the processor:

three or more source vectors comprising:

a center vector comprising a contiguous plurality of data lanes of the vector starting with a first data lane of the vector;

a left vector comprising a contiguous plurality of data lanes of the vector starting one data lane prior to the first data lane of the vector; and a right vector comprising a contiguous plurality of data lanes of the vector starting one data lane after the first data lane of the vector; and a kernel vector comprising a plurality of weighting values including a center weighting value, a left weighting value and a right weighting value; and subsequent to the loading, generating one or more output vectors respectively comprising weighted sums of the three or more source vectors loaded into the respective different vector registers, wherein generating a particular output vector of the one or more output vectors comprises executing a particular vector instruction of the plurality of vector instructions to:

load a scalar weighting value from a lane of the kernel vector, the lane specified to the particular vector instruction according to the particular output vector and a particular source vector of the three or more source vectors, wherein the particular source vector is specified as an operand of the particular vector instruction;

scale respective ones of a plurality of data lanes of the particular source vector by the loaded scalar weighting value to generate a scaled vector;

add the scaled vector to an accumulator vector stored in a vector accumulator to generate an output vector; and store the output vector in the vector accumulator;

wherein the vector instructions operate on one or more data registers comprising a plurality of data lanes each comprising multiple data bits.

9. The method of claim 8, wherein the loading of the left and right vectors comprises:

loading a previous vector immediately prior to the vector;

loading a next vector immediately subsequent to the vector;

executing a vector extraction instruction to generate the left vector using the previous vector and the vector; and executing the vector extraction instruction to generate the right vector using the vector and the next vector.

10. The method of claim 9, wherein executing the vector extraction instruction comprises:

concatenating a first vector register a second vector register to produce an intermediate result;

shifting the intermediate result left a number of lanes; and generating an output vector comprising an upper portion of the intermediate result.

11. The method of claim 8, wherein generating the particular output vector comprises executing for each one of the three or more source vectors a vector scaling instruction, wherein executing the vector scaling instruction comprises:

loading a weighting value from a specified lane of a register containing the kernel vector;

generating a scaled vector comprising respective data lanes of a vector register specified as an operand of the vector scaling instruction scaled by the weighting value; and adding the scaled vector to the particular one of the one or more output vectors.

12. The method of claim 8, wherein the convolution is a multi-dimensional convolution, and wherein the one or more output vectors comprises a plurality of output vectors.

13. The method of claim 8, wherein the convolution is performed as part of a convolutional neural network.

14. A non-transitory computer-readable storage medium storing a plurality of vector instructions that when executed on a processor cause the processor to perform a convolution on a vector comprising:

loading into different vector respective registers of the processor:

three or more source vectors comprising:

a center vector comprising a contiguous plurality of data lanes of the vector starting with a first data lane of the vector;

a left vector comprising a contiguous plurality of data lanes of the vector starting one data lane prior to the first data lane of the vector; and a right vector comprising a contiguous plurality of data lanes of the vector starting one data lane after the first data lane of the vector; and kernel vector comprising a plurality of weighting values including a center weighting value, a left weighting value and a right weighting value; and subsequent to the loading, generating one or more output vectors respectively comprising weighted sums of the three or more source vectors loaded into the respective different vector registers, wherein generating a particular output vector of the one or more output vectors comprises executing a particular vector instruction of the plurality of vector instructions to:

load a scalar weighting value from a lane of the kernel vector, the lane specified to the particular vector instruction according to the particular output vector and a particular source vector of the three or more source vectors, wherein the particular source vector is specified as an operand of the particular vector instruction;

scale respective ones of a plurality of data lanes of the particular source vector by the loaded scalar weighting value to generate a scaled vector;

add the scaled vector to an accumulator vector stored in a vector accumulator to generate an output vector; and store the output vector in the vector accumulator.

15. The non-transitory computer-readable storage medium of claim 14, wherein the loading of the left and right vectors comprises:

loading a previous vector immediately prior to the vector;

loading a next vector immediately subsequent to the vector;

executing a vector extraction instruction to generate the left vector using the previous vector and the vector; and executing the vector extraction instruction to generate the right vector using the vector and the next vector.

16. The non-transitory computer-readable storage medium of claim 15, wherein executing the vector extraction instruction comprises:

concatenating a first vector register a second vector register to produce an intermediate result;

shifting the intermediate result left a number of lanes; and generating an output vector comprising an upper portion of the intermediate result.

17. The non-transitory computer-readable storage medium of claim 14, wherein generating the particular output vector comprises executing for each one of the three or more source vectors a vector scaling instruction to perform:

loading a weighting value from a specified lane of a register containing the kernel vector;

generating a scaled vector comprising respective data lanes of a vector register specified as an operand of the vector scaling instruction scaled by the weighting value; and adding the scaled vector to the particular one of the one or more output vectors.

18. The non-transitory computer-readable storage medium of claim 14, wherein the convolution on the vector implements a stride value, wherein a value of data lanes to omit in the convolution for each data lane to include is based on the stride value, and wherein the loading of the three or more source vectors comprises:

loading a previous vector immediately prior to the vector;

loading a next vector immediately subsequent to the vector;

executing vector extraction instructions to generate first and second intermediate vectors using the previous vector, the vector and the next vector;

executing a vector shuffle instruction to load the left vector using the first and the second intermediate vectors; and executing vector shuffle instructions to load the center vector and right vector using the vector and next vector.

19. The non-transitory computer-readable storage medium of claim 14, wherein the convolution is a multi-dimensional convolution, and wherein the one or more output vectors comprises a plurality of output vectors.

20. The non-transitory computer-readable storage medium of claim 14, wherein the convolution is part of a convolutional neural network.

* * * * *

UNITED STATES PATENT AND TRADEMARK OFFICE
CERTIFICATE OF CORRECTION

| | |
|---|---|
| PATENT NO. | : 11,803,377 B2 |
| APPLICATION NO. | : 15/941975 |
| DATED | : October 31, 2023 |
| INVENTOR(S) | : Diamond et al. |

It is certified that error appears in the above-identified patent and that said Letters Patent is hereby corrected as shown below:

In the Drawings

On sheet 8 of 13, in FIG. 8, Line 12, delete "insruction" and insert -- instruction --, therefor.

In the Specification

In Column 5, Line 30, delete "10" and insert -- IO --, therefor.

In Column 5, Line 44, delete "10" and insert -- IO --, therefor.

In Column 6, Line 14, delete "he" and insert -- The --, therefor.

In Column 8, Line 3, delete "k1*s1'k2*s2" and insert -- k1*s1+k2*s2 --, therefor.

In Column 8, Line 29, delete "FIG.3," and insert -- FIG. 3, --, therefor.

In Column 8, Line 35, delete "400B," and insert -- 400B --, therefor.

In Column 11, Lines 29-38, delete "Multiply-and-Add vector instruction 860 shown in FIG. 8, each lane of a Source Vector 800 is multiplied by a scalar quantity specified by Lane 820 of a Kernel Vector 810 to form a Scaled Vector 830 which is added to a Base Vector 840 to produce an Output Vector 850. Using this vector instruction allows the weighting coefficients of the convolution kernel to be stored compactly in individual lanes of vectors rather than using a vector for each weighting coefficient. This reduces usage of the register file 114 as well as off-chip bandwidth requirements." and insert the same on Column 11, Line 28, as a continuation of the same paragraph.

In Column 9, Lines 47-48, delete "the of" and insert -- the --, therefor.

In Column 10, Line 30, delete "FIG.7" and insert -- FIG. 7 --, therefor.

Signed and Sealed this
Eleventh Day of June, 2024

*Katherine Kelly Vidal*

Katherine Kelly Vidal
*Director of the United States Patent and Trademark Office*

CERTIFICATE OF CORRECTION (continued)
U.S. Pat. No. 11,803,377 B2

In the Claims

In Column 17, Line 45, In Claim 4, delete "more the" and insert -- more --, therefor.